United States Patent [19]

Willyard

[11] 4,021,085

[45] May 3, 1977

[54] UNIVERSAL JOINT SEAL

[75] Inventor: John J. Willyard, Dearborn Heights, Mich.

[73] Assignee: Ford Motor Company, Dearborn, Mich.

[22] Filed: Nov. 6, 1975

[21] Appl. No.: 629,423

[52] U.S. Cl. .............................. 308/187.2; 64/17 R
[51] Int. Cl.² .......................................... F16C 1/24
[58] Field of Search ................ 308/187.1, 187.2; 64/17 A

[56] References Cited

UNITED STATES PATENTS

| 2,915,345 | 12/1959 | Workman | 308/187.2 |
|---|---|---|---|
| 2,926,939 | 3/1960 | Workman | 308/187.2 |
| 3,174,813 | 3/1965 | Selz | 308/187.2 |
| 3,324,681 | 6/1967 | Burns et al. | 64/17 A |
| 3,584,924 | 6/1971 | O'Neill | 308/187.2 |

Primary Examiner—Joseph F. Peters, Jr.
Assistant Examiner—Richard A. Bertsch
Attorney, Agent, or Firm—Clifford L. Sadler; Keith L. Zerschling

[57] ABSTRACT

A universal joint seal is disclosed for sealingly engaging the trunnion and the bearing cup of a Cardan type universal joint cross member. The seal has three sealing lips, one of which sealingly engages the spaced apart bearing surfaces of the trunnion and the bearing cup. That one sealing lip, in addition, resiliently engages the ends of the needle bearings contained within the cup to prevent their accidental dislocation.

13 Claims, 3 Drawing Figures

U.S. Patent  May 3, 1977  4,021,085
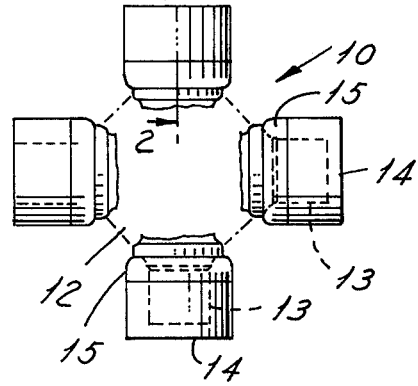
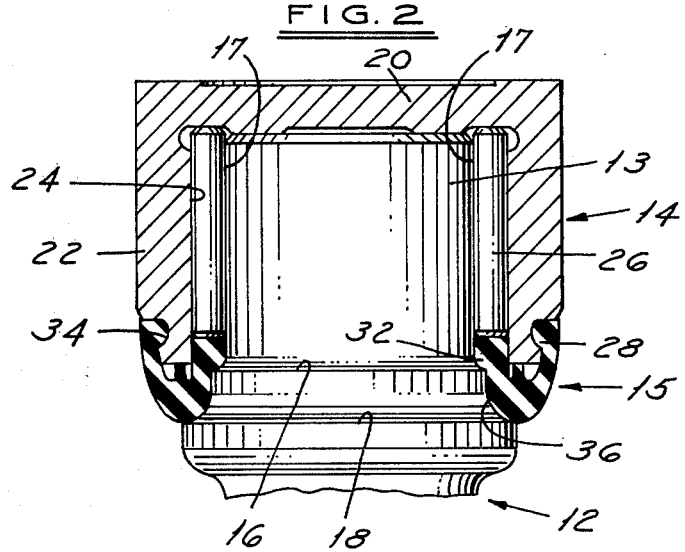
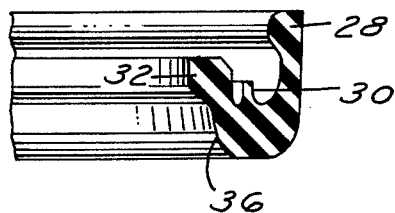

UNIVERSAL JOINT SEAL

BACKGROUND OF THE DISCLOSURE

This invention relates to seals for use in a Cardan type universal joint for sealingly engaging the end of the bearing cup and the trunnion of the journal cross member. The seal functions to contain lubricant within the bearing cup and to prevent the entry of contaminants into the bearing. The seal of the present disclosure is an improvement upon the seal disclosed in U.S. Pat. No. 3,174,813.

SUMMARY OF THE DISCLOSURE

In the presently preferred embodiment of this invention, a universal joint has a journal cross member or spider with a trunnion having a substantially cylindrical outwardly facing polished bearing surface. A bearing cup is fitted over the end of the trunnion and has an inwardly facing polished bearing surface spaced apart from the bearing surface of the trunnion. Needle bearings are interposed between the two bearing surfaces.

An annular seal has first, second and third lip portions. The first lip portion engages a groove in the exterior of the bearing cup. The second lip engages the annular end of the bearing cup. The third lip is compressed between the two bearing surfaces and engages the ends of the needle bearings to prevent their inadvertent dislocation.

A universal joint seal according to the present invention is characterized by its superior sealing characteristics and the manner in which it improves the operation of the needle bearings.

BRIEF SUMMARY OF THE DRAWINGS

The many objects and advantages of a universal joint seal according to this invention will become apparent upon consideration of the following detailed discussion and the accompanying drawings, in which:

FIG. 1 is a plan view of a journal cross member with bearing cups and seals assembled thereon for use in a Cardan type universal joint;

FIG. 2 is a cross sectional view of one of the trunnions and bearing cups of the journal cross member and bearing assembly taken along the section line 2—2 of FIG. 1; and FIG. 3 is an enlarged sectional view of the seal shown in FIG. 2.

DETAILED DESCRIPTION OF PRESENTLY PREFERRED EMBODIMENT

In the presently preferred embodiment of this invention, a journal cross member and bearing assembly 10 for a Cardan type universal joint is shown in FIG. 1. The assembly 10 includes a journal cross member 12 having two pairs of opposed trunnions 13 extending therefrom. Each trunnion rotatably supports a cup shape bearing member 14. An annular elastomeric seal 15 is sealingly interposed between the bearing cup 14 and the journal 12.

Referring to FIG. 2, the trunnion 13 has a substantially cylindrical outwardly facing polished bearing surface 17. The cross member 12 has first and second shoulders 16 and 18, with shoulder 16 situated adjacent the inner end of the bearing surface 17 of the trunnion 13 and shoulder 18 spaced inwardly of the shoulder 16.

The bearing cup 14 has a bottom wall 20 that abuts the end of the trunnion 13. The cup 14 also has a cylindrical wall 22 connected to the bottom wall 20 which provides a substantially cylindrical inwardly facing polished bearing surface 24 spaced apart from the bearing surface 17 of the trunnion 13. A plurality of circumferentially positioned needle bearings 26 engage the two bearing surfaces 17 and 24. The outer ends of the needle bearings 26 contact the bottom wall 20 of the bearing cup.

The elastomeric seal 15 has first, second and third integral lip portions 28, 30 and 32 that are spaced apart. As seen in FIG. 2, a groove 34 is formed in the outer surface of the bearing cup 14 adjacent its open end. The seal lip 28 has a generally bulbous configuration in cross section and is seated in the groove 34. The second lip 30 is of generally thin wall construction and abuts the annular end of the wall 22 of the bearing cup 14.

The third lip portion 32 of the seal 15 is positioned within the open end of the bearing cup 14 and sealingly engages both the inwardly facing polished bearing surface 24 and the outwardly facing bearing surface 17 of the trunnion 13. In addition, a slight interference fit is provided between the lip portion 32 and the ends of the needle bearings 26.

The curved inwardly facing surface 36 of the seal 15 engages the shoulders 16 and 18 of the cross member 12 and is flush against the surface of the cross member between the two shoulders.

OPERATION

When the bearing cup 14 is positioned upon the trunnion 13, the wall 20 engages the end of the trunnion 13. In this configuration, the elastomeric seal 15 is trapped against the shoulders 16 and 18 and its lip portion 32 is held in resilient engagement with the ends of the needle bearings 26. This engagement prevents accidental dislocation of the needle bearings 26.

The lip portion 32 of the seal 15 has a generally bulbous shape in cross section and forms the primary sealing means. It is in engagement with the bearing surfaces for the needle bearings 26 which are finely finished and, therefore, superior sealing characteristics are achieved. The second lip 30 also provides secondary sealing as does the first lip 28. The surface 36 of the seal 15 engages the shoulder 18 and the surface between that shoulder and the shoulder 16 of the journal cross member 12. The intermediate surface between the shoulders 16 and 18 is not a bearing surface and, therefore, it does not have a finely polished surface condition. While the engagement of the surface 36 with surface of the journal 12 adjacent the shoulder 18 provides secondary sealing, it is the engagement of the lip 32 with the polished bearing surfaces 17 and 24 which provides the primary sealing.

The foregoing description presents the presently preferred embodiment of this invention. Modifications and alterations may occur to those skilled in the art that will come within the scope and spirit of the following claims.

I claim:

1. A bearing assembly comprising first and second bearing members having facing polished bearing surfaces;

a plurality of anti-friction bearing elements interposed between said facing bearing surfaces;

an annular elastomeric seal interposed between said bearing members having a lip sealingly engaging both of said bearing surfaces of said bearing members;
said lip engaging said bearing elements and constructed to, in part, locate said elements relative to said first and second bearing members.

2. A bearing assembly in accordance with claim 1 and including:
said bearing surfaces being substantially cylindrical;
said bearing elements comprising a plurality of needle bearings.

3. A bearing assembly comprising an inner bearing member having an outwardly facing polished bearing surface;
an outer bearing member having an inwardly facing polished bearing surface spaced apart from said outwardly facing surface;
a plurality of anti-friction bearing elements interposed between said outwardly facing bearing surface and said inwardly facing surface;
an annular elastomeric seal interposed between said inner bearing member and said outer bearing member;
said seal having a plurality of spaced apart lips;
one of said lips being in sealed engagement with said outer bearing member;
another of said lips sealingly engaging both said outwardly facing bearing surface and said inwardly facing bearing surface.

4. A bearing assembly in accordance with claim 3 and including:
said outwardly facing bearing surface being substantially cylindrical;
said inwardly facing bearing surface being substantially cylindrical;
said bearing elements comprising a plurality of needle bearings.

5. A bearing assembly in accordance with claim 4 and including:
said another of said lips engaging said needle bearings and constructed to, in part, locate said needle bearings relative to said inner and outer bearing members.

6. A bearing assembly comprising a bearing member having a trunnion with an outwardly facing substantially cylindrical bearing surface;
a bearing cup having an inwardly facing substantially cylindrical bearing surface spaced apart from said outwardly facing surface;
said bearing cup having a base portion engaging the end of said trunnion;
a plurality of needle bearings interposed between said outwardly facing bearing surface and said inwardly facing bearing surface;
an elastomeric seal interposed between said trunnion and said bearing cup;
said seal having an enlarged lip sealingly engaging said outwardly facing bearing surface and said inwardly facing bearing surface.

7. A bearing assembly according to claim 6 and including:
said lip resiliently engaging the ends of said needle bearings.

8. A bearing assembly comprising a trunnion having an outwardly facing substantially cylindrical bearing surface;
a bearing member having an inwardly facing substantially cylindrical bearing surface spaced apart from said outwardly facing surface;
a plurality of needle bearings interposed between said outwardly facing bearing surface and said inwardly facing surface;
an elastomeric seal interposed between said trunnion and said bearing member;
said seal having spaced apart integral first and second annular lips;
said bearing member having an annular outwardly opening groove and said first lip being seated in said groove;
said second lip sealingly engaging both said outwardly facing bearing surface and said inwardly facing bearing surface.

9. A bearing assembly according to claim 8 and including:
said seal having a third lip spaced apart from said first and second lips;
said bearing member having an annular end surface and said third lip being in abutting engagement with said end surface.

10. A bearing assembly according to claim 8 and including:
said second lip resiliently engaging the ends of said needle bearings.

11. A bearing assembly for a universal joint comprising a journal cross member having a trunnion with an outwardly facing substantially cylindrical bearing surface;
a bearing cup having an inwardly facing substantially cylindrical bearing surface spaced apart from said outwardly facing bearing surface;
said bearing cup having a base portion engaging the end of said trunnion;
a plurality of needle bearings operatively interposed between said outwardly facing bearing surface and said inwardly facing bearing surface;
an elastomeric seal interposed between said journal cross member and said bearing cup;
said seal having spaced apart integral first and second annular lips;
said bearing member having an annular outwardly opening groove and said first lip being seated in said groove;
said second lip having a generally bulbous shape in cross section and sealingly engaging both said outwardly facing bearing surface and said inwardly facing bearing surface;
said journal cross member having a shoulder adjacent one end of said outwardly facing bearing surface;
said seal having a curved portion in flush engagement with the surface of said journal cross member between said shoulder and said outwardly facing bearing surface.

12. A bearing assembly in accordance with claim 11 and including:
said second lip resiliently engaging the ends of said needle bearings.

13. A bearing assembly in accordance with claim 11 and including:
said second lip resiliently engaging the ends of said needle bearings;
said bearing cup having an annular end surface and said seal having a lip in abutting engagement with said end surface;
said journal cross member having a second shoulder spaced apart from said first mentioned shoulder;
said seal having a curved portion in flush engagement with the surface of said journal cross member between said first mentioned shoulder and said second shoulder.

* * * * *